(12) United States Patent
Zhang (10) Patent No.: US 10,318,741 B2
(45) Date of Patent: Jun. 11, 2019

(54) DATA SECURITY AND RISK RANKING TOOL

(71) Applicant: Bank of America Corporation, Charlotte, NC (US)

(72) Inventor: Zhidong Zhang, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 248 days.

(21) Appl. No.: 15/357,729

(22) Filed: Nov. 21, 2016

(65) Prior Publication Data

US 2018/0144138 A1     May 24, 2018

(51) Int. Cl.
*G06F 21/57* (2013.01)
*H04L 29/06* (2006.01)

(52) U.S. Cl.
CPC ........ *G06F 21/577* (2013.01); *H04L 63/1433* (2013.01)

(58) Field of Classification Search
CPC ............. H04L 63/1416; H04L 63/1408; H04L 63/1441; H04L 63/1458
USPC .......................................................... 726/25
See application file for complete search history.

(56) References Cited

U.S. PATENT DOCUMENTS

| | | |
|---|---|---|
| 7,890,518 B2 | 2/2011 | Aasman |
| 7,993,915 B2 | 8/2011 | Horwitz |
| 8,396,884 B2 | 3/2013 | Singh et al. |
| 8,402,023 B2 | 3/2013 | Sheehan et al. |
| 8,595,282 B2 | 11/2013 | Nachenberg |
| 9,053,210 B2 | 6/2015 | Elnikety et al. |
| 2014/0280224 A1 | 9/2014 | Feinberg et al. |
| 2017/0286690 A1* | 10/2017 | Chari ................... G06F 21/577 |

* cited by examiner

*Primary Examiner* — Evans Desrosiers
(74) *Attorney, Agent, or Firm* — Michael A. Springs (57) ABSTRACT

A risk ranking tool includes a retrieval engine, a data risk engine, an operational risk engine, and a data security engine. The data risk engine calculates, using graph data, a plurality of calculated data risk scores that each indicate an amount of data risk for nodes of the graph data. The operational risk engine calculates, using the graph data, a plurality of calculated operational risk scores that each indicate an amount of operational risk for nodes of the graph data. The data security engine determines whether any of the calculated data or operational risk scores equal or exceed a predefined score, and in response, initiates a security action related to the calculated risk score that exceeds the predefined score.

20 Claims, 7 Drawing Sheets

DATA SECURITY AND RISK RANKING TOOL

TECHNICAL FIELD

This disclosure relates generally to data security and more particularly to a data security and risk ranking tool.

BACKGROUND

The security of data and computing systems is important to most businesses. To control and understand their vulnerabilities, companies may perform a risk analysis of its data and systems. Typical risk analysis for data and computing systems, however, is inadequate and may result in vulnerabilities being overlooked.

SUMMARY OF THE DISCLOSURE

According to some embodiments, a risk ranking tool includes a retrieval engine, a data risk engine, an operational risk engine, and a data security engine. The data risk engine calculates, using graph data from a graph database, a plurality of calculated data risk scores that each indicate an amount of data risk for nodes of the graph data. The operational risk engine calculates, using the graph data, a plurality of calculated operational risk scores that each indicate an amount of operational risk for nodes of the graph data. The data security engine determines whether any of the calculated data or operational risk scores equal or exceed a predefined score, and if so, initiates a security action related to the calculated risk score that exceeds the predefined score.

Certain embodiments provide one or more technical advantages. For example, some embodiments continuously analyze and rank data risks of computer servers, applications, user roles, permissions, and people in order to identify and correct excessively high data security risks. As another example, some embodiments continuously analyze and rank operational risks of computer servers, permissions, user roles, and people in order to identify and correct excessively high operational security risks. If an excessively high data or operational security risk is identified, some embodiments may send an alert and initiate corrective actions such as moving data to other computing systems, applying security software, putting a server behind a firewall, and the like. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 6 of the drawings, like numerals being used for like and corresponding parts of the various drawings.

The security of data and computing systems is important to most companies. To control and understand their vulnerabilities in these areas, many companies expend considerable effort and resources on risk management. Typical risk management and risk analysis efforts focus on accuracy and coverage of risk ranking. For example, in some companies, the risk of an employee is ranked by his/her job role. However, typical risk management efforts often result in inaccurate risk rankings. For example, if a first system administrator manages many production servers while a second system administrator only manages development servers, the actual risk levels for the two system administrators are vastly different despite both employees having the same job role. Furthermore, some companies may only rank the risk of important data and ignore the risks of the servers that store the data and the employees who can access the data. This may result in poor risk ranking coverage and may result in vulnerabilities being overlooked.

To address these and other deficiencies of current risk management systems, embodiments of the disclosure provide a data security and risk ranking tool that utilizes a graph database, which includes entities to be risk ranked, to perform data security and risk analysis. The entities in the graph database, which may correspond to servers, data types, applications, permissions, user roles, employees, etc., may be linked to one or more other entities in the graph database via edges. The linking of entities in the graph database allows embodiments to perform accurate risk ranking of entities using defined risk scores of certain other entities. Embodiments may, for example, start with first entities that can be accurately risk ranked (e.g., lowest level entities) in order to automatically risk rank other entities that are either directly or indirectly linked to the first entity (e.g., higher level entities). Once entities have been risk ranked (e.g., by physically transforming data within the graph database), some embodiments may send an alert if certain risk scores are determined to be over a threshold value. Some embodiments may also automatically initiate security actions based on calculated risk scores. These security actions may include moving data to other computing systems, applying security software, putting a server behind a firewall, and the like. As a result, embodiments provide a more accurate and complete way to rank the data and operational risks of a company.

Figure 1:
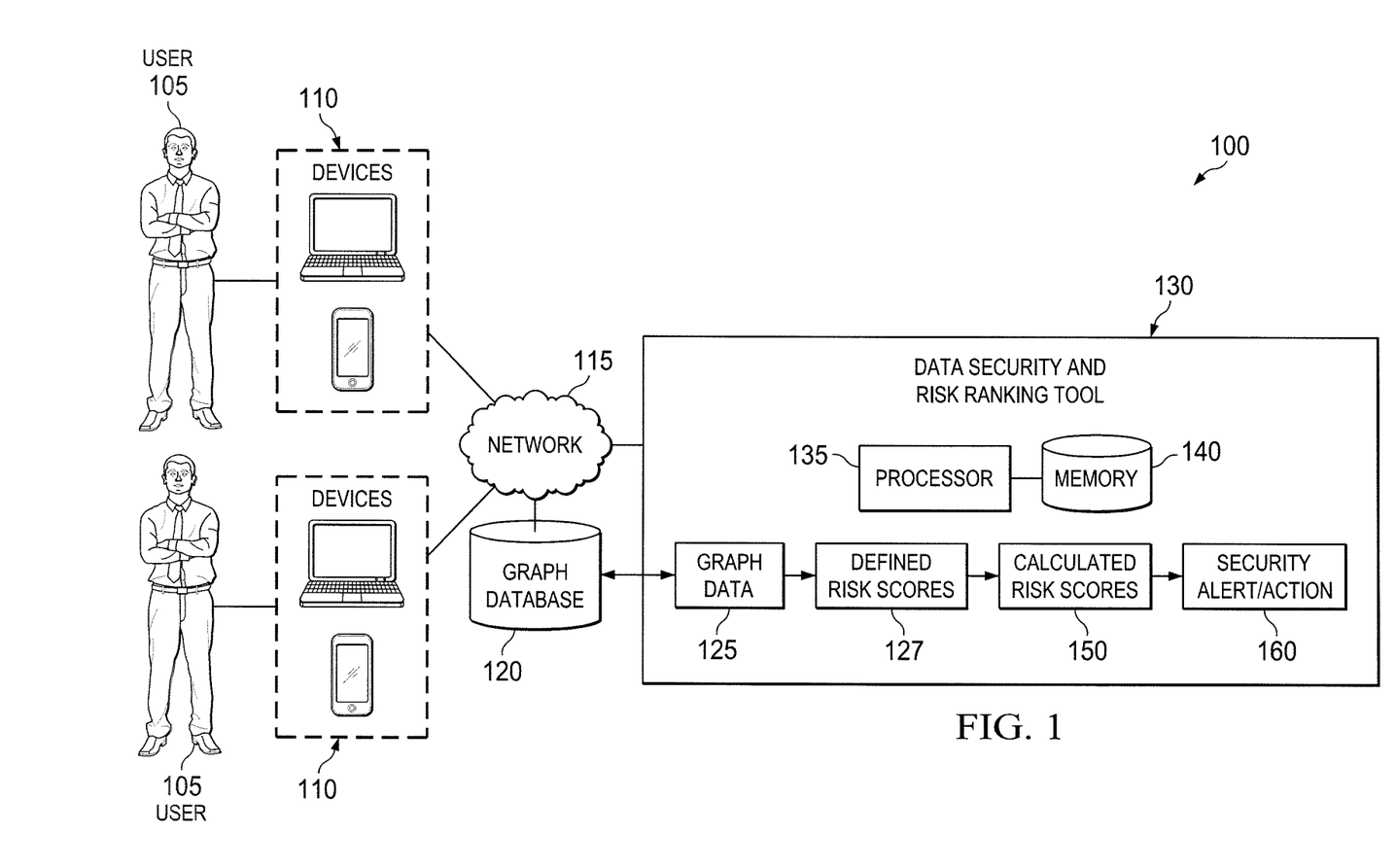
FIG. 1 illustrates a system for ranking data security and risk, according to certain embodiments.
Figure 2:
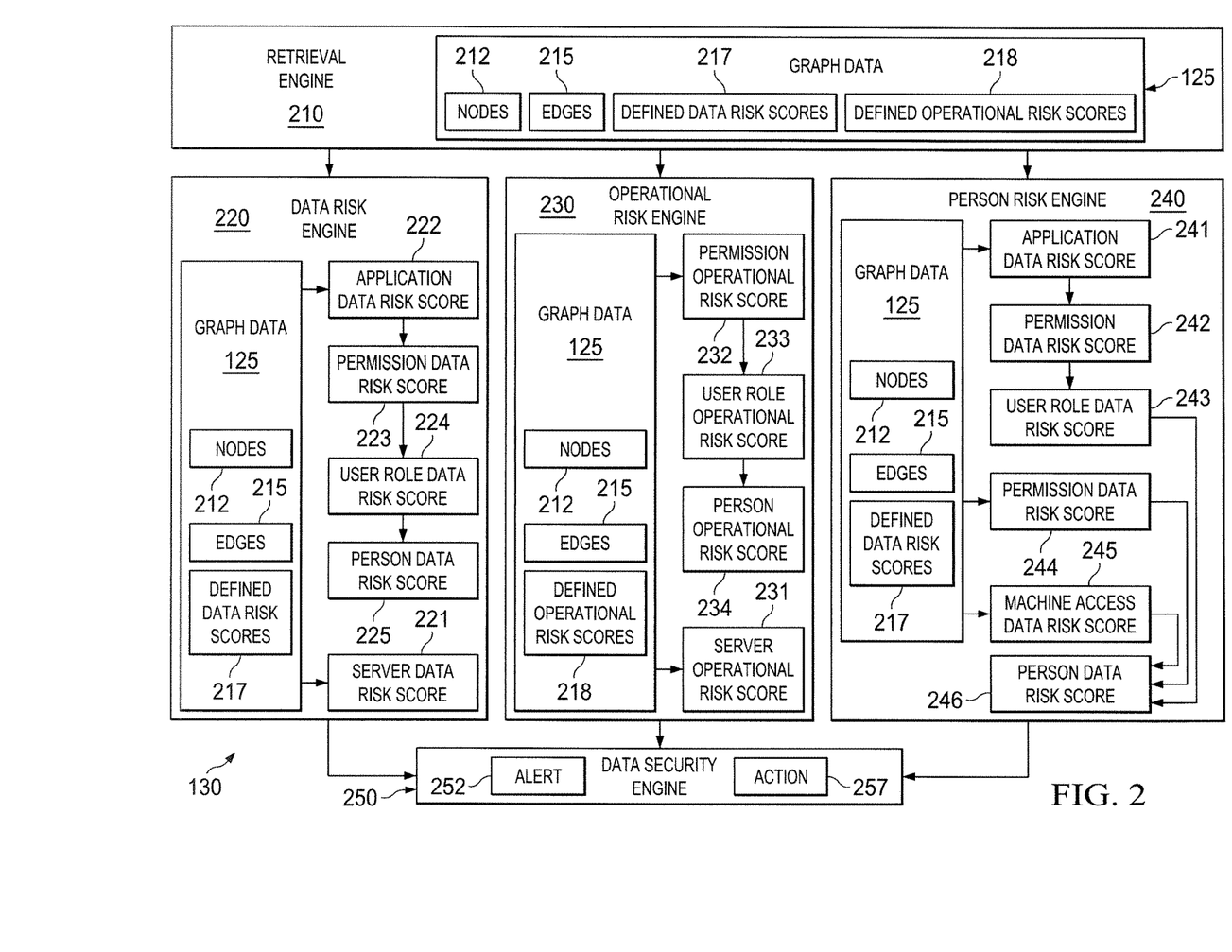
FIG. 2 illustrates the data security and risk ranking tool of the system of FIG. 1, according to certain embodiments.
Figure 3:
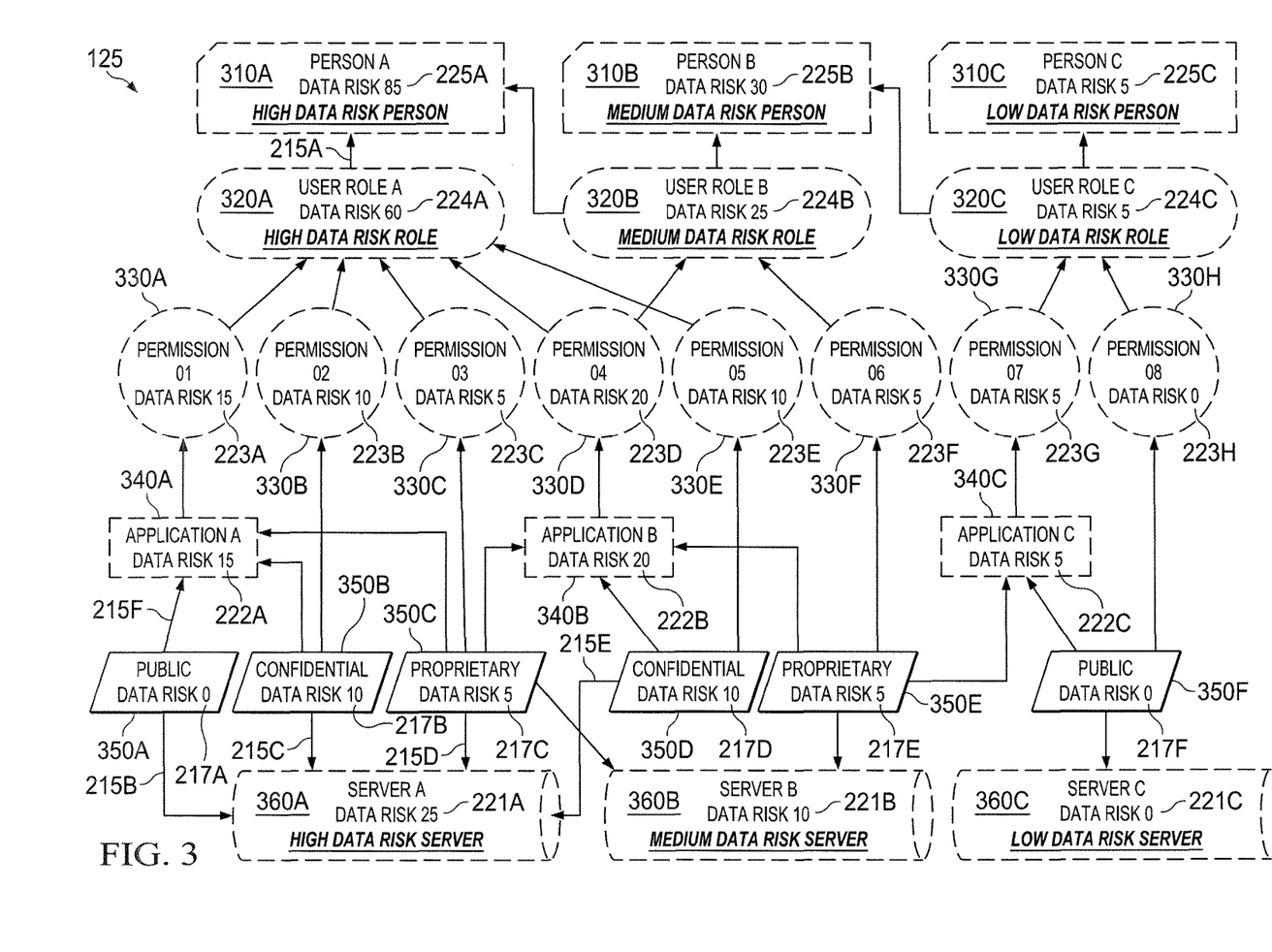
FIGS. 3, 4, 5A, and 5B illustrate example graph data of the system of FIG. 1, according to certain embodiments.
Figure 4:
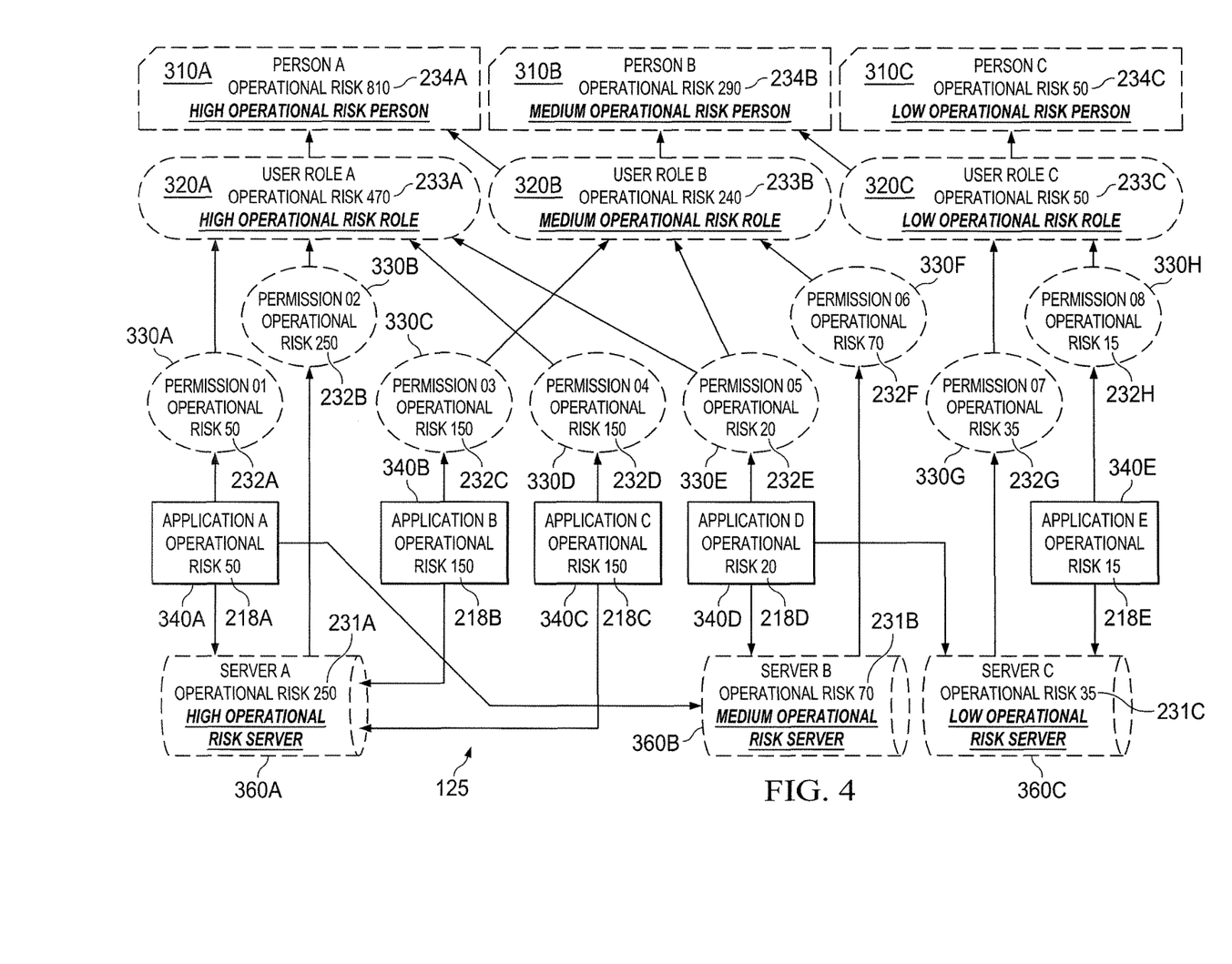
Figure 5A:
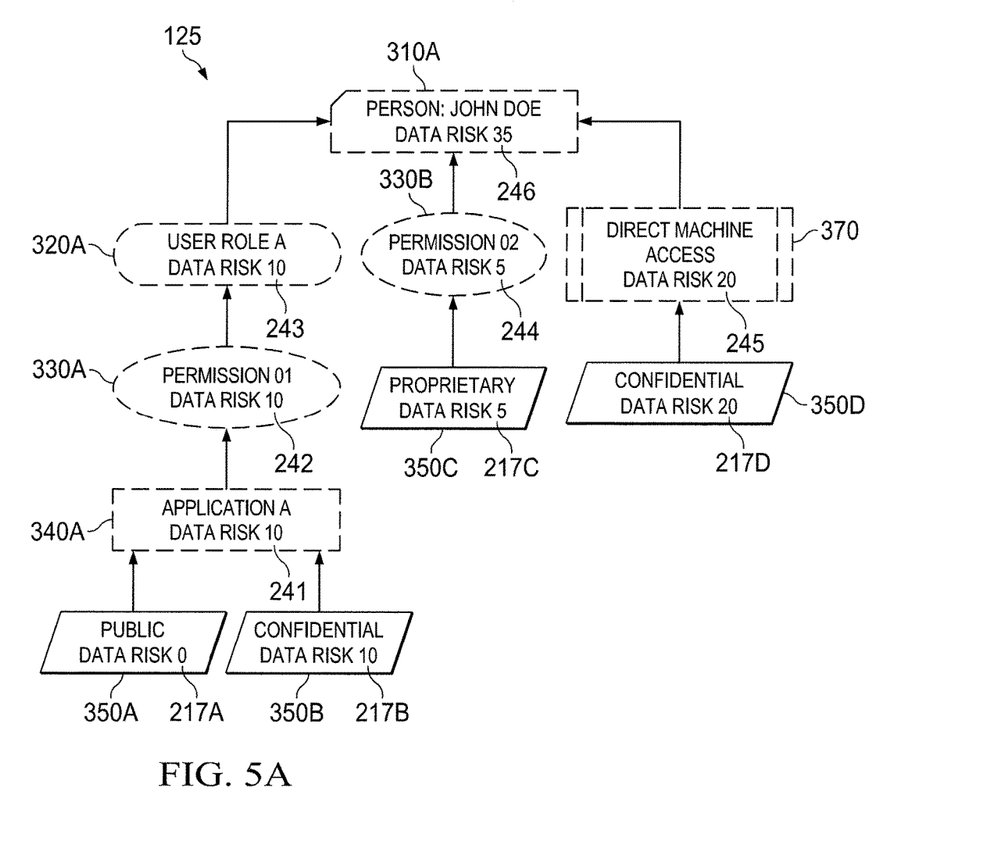
Figure 5B:
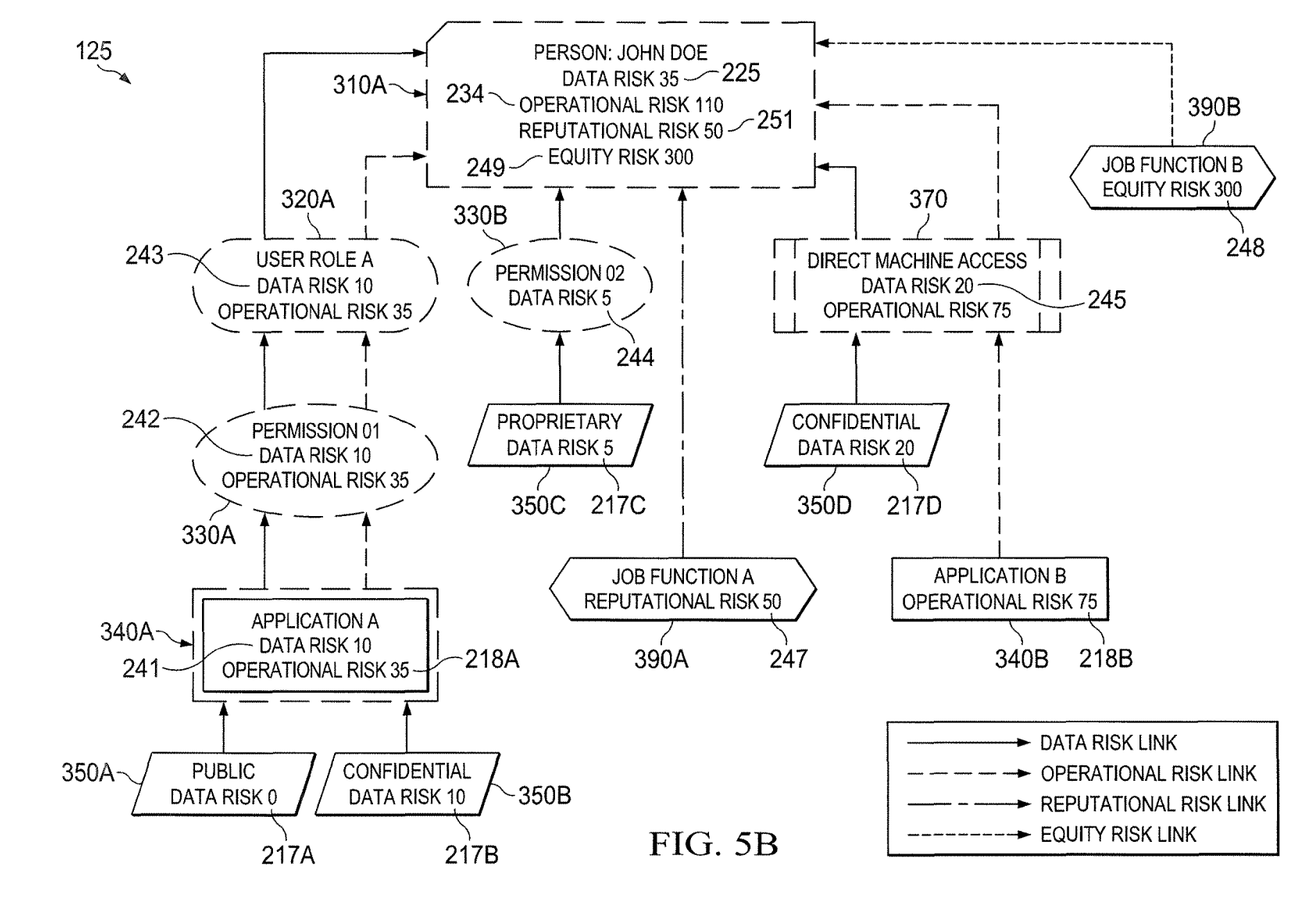
Figure 6:
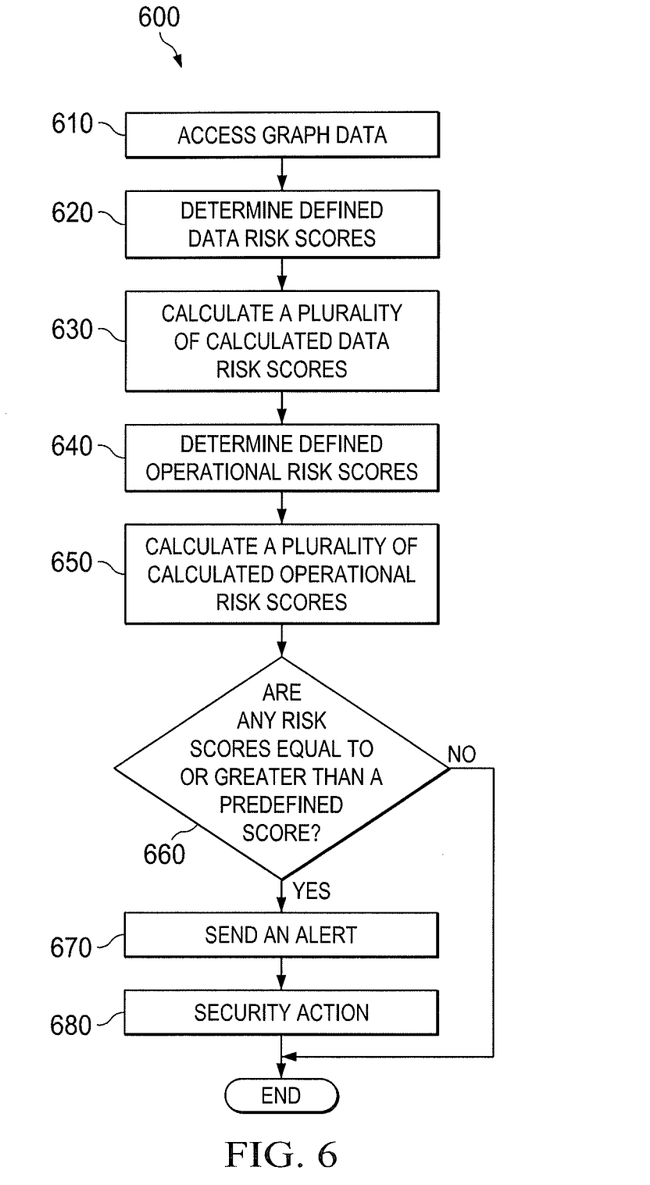
FIG. 6 is a flowchart illustrating a method for ranking data security and risk using the system of FIG. 1, according to certain embodiments.

Embodiments of the data security and risk ranking tool will be described in more detail using FIGS. 1 through 6. FIG. 1 generally illustrates a system that includes the data security and risk ranking tool. FIG. 2 illustrates the data security and risk ranking tool in more detail. FIGS. 3-5 illustrate embodiments of the graph data that may be used and transformed by the data security and risk ranking tool. FIG. 6 illustrates an example method utilized by the data security and risk ranking tool.

FIG. 1 illustrates a system 100 for ranking data security and risk, according to certain embodiments. As illustrated in FIG. 1, system 100 includes one or more devices 110, a network 115, a graph database 120, and a data security and risk ranking tool 130. In general, data security and risk ranking tool 130 provides enhanced security of data and computing systems such as devices 110 and other servers connected to network 115 by automatically ranking data and operational risks using graph database 120.

Data and operational risks are important to most companies. An example of a data risk is non-public information (NPI) such as customers' social security numbers leaking to the public. If such an event occurs, the company may be fined by government agencies or face other penalties. An example of an operational risk may be the risk of certain applications being unavailable. As a specific example, if an application such as a website is down, the company may experience lost business. Data security and risk ranking tool 130 quantifies these risks using graph data 125 so that companies may focus on areas of highest risk.

User 105 may be any person who has access to any device 110 or any data stored on device 110. In some embodiments, user 105 may be an employee of a company. User 105 may have any assigned role (e.g., system administrator) or title within the company.

Device 110 may be any appropriate device for sending and receiving communications over network 115. As an example and not by way of limitation, device 110 may be a computer, a server, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Graph database 120 may be any storage that stores graph data 125. Unlike a typical relational database, graph database 120 stores nodes (e.g., nodes 212) and connections between the nodes (e.g., edges 215) in graph data 125 in order to show relationships between the nodes. Graph data 125 also stores risk scores for entities within graph data 125. Examples of graph data 125 are illustrated in FIGS. 3-5 and are described in more detail below. While graph database 120 is illustrated as being separate from data security and risk ranking tool 130, in some embodiments, graph database 120 may be within data security and risk ranking tool 130 or any other device 110.

Data security and risk ranking tool 130 provides enhanced security of data and computing systems by automatically ranking data and operational risks using graph data 125 of graph database 120. As illustrated in FIG. 1, data security and risk ranking tool 130 includes a processor 135 and a memory 140. This disclosure contemplates processor 135 and memory 140 being configured to perform any of the tasks of data security and risk ranking tool 130 described herein. In certain embodiments, data security and risk ranking tool 130 improves data and operational risk management by continuously calculating and monitoring risk scores for entities (e.g. nodes 212) within graph data 125. In some embodiments, data security and risk ranking tool 130 may automatically perform security actions (e.g., actions 257) to address data or operational risks that are above a certain threshold. In some embodiments, data security and risk ranking tool 130 may send an alert (e.g., alert 252) if a data or operational risk score is above a certain threshold.

Processor 135 is any electronic circuitry, including, but not limited to microprocessors, application specific integrated circuits (ASIC), application specific instruction set processor (ASIP), and/or state machines, that communicatively couples to memory 140 and controls the operation of data security and risk ranking tool 130. Processor 135 may be 8-bit, 16-bit, 32-bit, 64-bit or of any other suitable architecture. Processor 135 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 135 may include other hardware and software that operates to control and process information. Processor 135 executes software stored on memory to perform any of the functions described herein. Processor 135 controls the operation and administration of data security and risk ranking tool 130 by processing information received from network 115, device(s) 110, graph database 120, and memory 140. Processor 135 may be a programmable logic device, a microcontroller, a microprocessor, any suitable processing device, or any suitable combination of the preceding. Processor 135 is not limited to a single processing device and may encompass multiple processing devices.

Memory 140 may store, either permanently or temporarily, data, operational software, or other information for processor 135. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage. For example, the software may be embodied in memory 140, a disk, a CD, or a flash drive. In particular embodiments, the software may include an application executable by processor 135 to perform one or more of the functions described herein.

In operation, data security and risk ranking tool 130 retrieves or otherwise accesses graph data 125 in graph database 120. Data security and risk ranking tool 130 may then identify defined risk scores 127 within graph data 125. In some embodiments, defined risk scores 127 are risk scores that are pre-determined or pre-assigned by a company, enterprise, or employee. For example, as illustrated in FIGS. 3-5, the risk scores of nodes that have solid outlines (e.g., nodes 350A-F in FIG. 3) may have defined risk scores 127. Using defined risk scores 127 and graph data 125, data security and risk ranking tool 130 may then determine calculated risk scores 150. In one embodiment, for example, the risk values of higher level entities (e.g., nodes 310) may be calculated by adding up the risk values of connected lower level entities in graph data 125 (e.g., nodes 320, 330, 340, and 350). Specific examples of determining calculated risk scores 150 are discussed in more detail below. Once calculated risk scores 150 are determined, they may be written back to graph data 125 (e.g., graph data 125 may be physically transformed).

Once calculated risk scores 150 are determined, some embodiments of data security and risk ranking tool 130 may analyze calculated risk scores 150 to determine which entities are high risk. In some embodiments, for example, data security and risk ranking tool 130 may compare calculated risk scores 150 to a predetermined threshold score. If a particular calculated risk score 150 is at or above the threshold score, data security and risk ranking tool 130 may determine that the calculated risk score 150 is a high risk and proceed to security alert/action 160 where an alert (e.g., alert 252) is sent and/or an action (e.g., action 257) is performed. In some embodiments, data security and risk ranking tool 130 may rank calculated risk scores 150 for particular entities in order to determine which entities are at highest risk. For example, the risk scores (e.g., person data risk score 225 described below) of person nodes 310 within graph data 125 may be ranked from highest to lowest (or vice versa). The person node 310 with the highest risk score (e.g., highest person data risk score 225) may be determined to be the greatest risk. A security alert/action 160 for the node with the greatest risk may then be initiated by data security and risk ranking tool 130.

In some embodiments, data security and risk ranking tool 130 continuously performs risk ranking of entities within graph data 125. For example, data security and risk ranking tool 130 may perform risk ranking within graph data 125 as described herein on a predefined schedule or at a predefined interval (e.g., every hour). In some embodiments, data security and risk ranking tool 130 may perform risk ranking within graph data 125 based on a request from a user 105. For example, user 105 may send a request to data security and risk ranking tool 130 for a risk score of a specific entity within graph data 125 (e.g, for a specific server). In response to the request, data security and risk ranking tool 130 may access graph data 125, calculate a risk score for the requested entity, and then send the calculated risk score back to user 105 for viewing (e.g., on device 110). In some embodiments, data security and risk ranking tool 130 may generate a report that illustrates graph data 125 as illustrated in FIGS. 3-5.

In general, system 100 including data security and risk ranking tool 130 has very good extensibility. When an actually/manually risk ranked entity is added into graph data 125, the risk ranks of other exiting entities that link to this new entity either directly or indirectly may be automatically updated. When a not manually risk rank-able entity is plugged into graph data 125, this entity may automatically get its risk rank based on the existing risk ranked entities that link to it.

FIG. 2 illustrates an example embodiment of data security and risk ranking tool 130 of FIG. 1. As illustrated in FIG. 2, data security and risk ranking tool 130 includes a retrieval engine 210, a data risk engine 220, a operational risk engine 230, a person risk engine 240, and a data security engine 250. Each component of data security and risk ranking tool 130 is discussed in more detail below.

Retrieval engine 210 generally communicates with graph database 120 in order to access graph data 125. In some embodiments, graph data 125 includes nodes 212, edges 215, defined data risk scores 217, and defined operational risk scores 218. Nodes 212 each represent an entity such as a person or a computing system. Examples of nodes 212 include person nodes 310, user role nodes 320, permission nodes 330, application nodes 340, data type nodes 350, server nodes 360, and machine access nodes 370, as illustrated in FIGS. 3-5. Each person node 310 (e.g., person nodes 310A-C) represents a user/person/employee such as user 105. Each user role node 320 (e.g., user roles 320A-C) represents a specific role that each user/person/employee of person node 310 may have within a company (e.g., system administrator). Each permission node 330 (e.g., permission nodes 330A-H) represents a specific permission that each role of user role node 320 may have (e.g., edit/read/copy, etc.). Each application node 340 (e.g., application nodes 340A-C) represents a specific application/software program. Each data type node 350 (e.g., data type nodes 350A-F) represents a type of data (e.g., public, confidential, proprietary, etc.). Confidential data may include data such as passwords, social security numbers, and the like. Proprietary data may include data that is only partially confidential (e.g., login names, network IDs, phone numbers, etc.). Each application node 340 (e.g., application nodes 340A-C) represents a specific application/software program. Each server node 360 (e.g., server nodes 360A-C) represents a specific computing device such as a webserver.

Graph data 125 also includes edges 215 between nodes 212. Each edge 215 indicates a connection between two nodes 212. In general, each node 212 may have any number of edges 215 that connect it to one or more other nodes 212. As an example, person node 310A in FIG. 3 has one edge 215A that connects it with user role node 320A. As another example, server node 360A in FIG. 3 has four edges 215 (e.g., 215B-E) that connects it with four different data type nodes 350. In general, each edge 215 indicates how risk scores are propagated between nodes. To illustrate this using the examples above, the risk score of user role node 320A (e.g., user role data risk score 224A of 60) is transferred to person node 310A, and the risk scores of data type nodes 350A-D (e.g., defined data risk scores 217A-D of 0, 10, 5, and 10) are transferred to server node 360A. In some embodiments, all risk scores that are propagated to a particular node 212 are added together to calculate that node's risk score (e.g., 0+10+5+10=25 for server node 360A).

Defined data risk scores 217 are data risk scores that are predetermined or manually provided for certain nodes 212. In the example graph data 125 of FIG. 3, for example, defined data risk scores 217 are provided for nodes 212 that have solid outlines (e.g., data type nodes 350 in FIG. 3.) In some embodiments, defined data risk scores 217 are manually input into graph database 120 by user 105 (e.g., an employee) using device 110.

Defined operational risk scores 218 are operational risk scores that are predetermined or manually provided for certain nodes 212. In the example graph data 125 of FIG. 4, for example, defined operational risk scores 218 are provided for nodes 212 that have solid outlines (e.g., application node 340 in FIG. 4.) In some embodiments, defined operational risk scores 218 are manually input into graph database 120 by user 105 (e.g., an employee) using device 110.

In general, risk scores such as those illustrated in FIGS. 3-5 are any appropriate numbers to represent risk. In some embodiments, the risk scores are arbitrary numbers that have been normalized to themselves. In some embodiments, the risk scores are chosen to comply with a specific scale (e.g., a scale of 1-10).

Data risk engine 220 calculates data risk scores of certain nodes 212 using graph data 125 and defined data risk scores 217. Using the example graph data 125 of FIG. 3, data risk engine 220 calculates server data risk scores 221A-C for server nodes 360A-C, application data risk scores 222A-C for application node 340A-C, permission data risk scores 223A-H for permission nodes 330A-H, user role data risk scores 224A-C for user role nodes 320A-C, and person data risk scores 225A-C for person nodes 310A-C.

In some embodiments, data risk engine 220 may first determine which nodes 212 have defined data risk scores 217. In the example of FIG. 3, data risk engine 220 may determine that data type nodes 350 have defined data risk scores 217. Data risk engine 220 may then propagate defined data risk scores 217 out from data type nodes 350 according to edges 215. For example, the risk score of data type node 350A (e.g., defined data risk score 217A of 0) may be propagated according to edges 215B and 215F to server node 360A and application node 340A in order to calculate server data risk score 221A and application data risk score 222A, respectively. Data risk engine 220 may calculate the risk score of each node 212 using any appropriate method. For example, data risk engine 220 may add all risk scores together that are propagated to each node 212.

As a specific example of data risk engine 220 calculating risk scores according to graph data 125 and defined data risk scores 217, consider the example of determining person data risk score 225B of person node 310B of FIG. 3. Data risk engine 220 may first determine application data risk score 222B by adding defined data risk scores 217C-E according to the edges 215 between application node 340B and data type nodes 350C-E. This results in an application data risk score 222B of 20 (5+10+5). Data risk engine 220 may then calculate permission data risk score 223D by propagating application data risk score 222B according to the edge 215 between permission node 330D and application node 340B. This results in a permission data risk score 223D of 20. Data risk engine 220 may then calculate user role data risk score 224B by adding permission data risk scores 223D and 223F according to the edges 215 between user role node 320B and permission nodes 330D and 330F. This results in a user role data risk score 224B of 25 (20+5). Data risk engine 220 may then calculate person data risk score 225B by adding user role data risk scores 224B and 224C according to the edges 215 between person node 310B and user role nodes 320B and 320C. This results in a person data risk score 225B of 30 (25+5). Data risk engine 220 may repeat this process in order to determine person data risk score 225A and person data risk score 225C.

Once data risk engine 220 has calculated risk scores for a certain type of node 212 (e.g., person nodes 310), data risk engine 220 may then order the calculated risk scores in order to rank the risk scores. For example, data risk engine 220 may order person data risk scores 225 from highest to lowest in order to assign a ranking to person data risk scores 225. In the example of FIG. 3, data risk engine 220 may assign a "high data risk person" ranking to person node 310A since it has the highest person data risk score 225 of 60, a "medium data risk person" ranking to person node 310B since it has the middle person data risk score 225 of 30, and a "low data risk person" ranking to person node 310C since it has the lowest person data risk score 225 of 5.

In some embodiments, data risk engine 220 may utilize any formula to calculate data risk scores (e.g., weighting, ratios, fractions, etc.). In some embodiments, simple addition may be utilized. In other embodiments, any risk formula that can combine two or more risk rankings in a justifiable way can be substituted for simple addition of risks. For example, consider an example where an application is installed on two paired production servers. If the operational risk of this application is 100, each of the two servers that it is installed on can be treated as operational risk 50. But if the same application is installed on one production server and one contingent server, the production server may have operation risk 60 and the contingent server may only have operational risk 40.

Operational risk engine 230 calculates operational risk scores of certain nodes 212 using graph data 125 and defined operational risk scores 218. Using the example graph data 125 of FIG. 4, operational risk engine 230 calculates server operational risk scores 231A-C, permission operational risk scores 232A-H, user role operational risk scores 233A-C, and person operational risk scores 234A-C.

In general, operational risk engine 230 may calculate operational risk scores in a similar manner to how data risk engine 220 calculates data risk scores. In some embodiments, for example, operational risk engine 230 may first determine which nodes 212 have defined operational risk scores 218. In the example of FIG. 4, operational risk engine 230 may determine that application nodes 340 have defined operational risk scores 218. Operational risk engine 230 may then propagate defined operational risk scores 218 out from application nodes 340 according to edges 215. For example, the risk score of application node 340B (e.g., defined operational risk scores 218B of 150) may be propagated according to edges 215 to server node 360A and permission node 330C in order to calculate server operational risk score 231A and permission operational risk score 232C, respectively. Operational risk engine 230 may calculate the risk score of each node 212 using any appropriate method. For example, operational risk engine 230 may add all risk scores together that are propagated to each node 212 as described above in reference to data risk engine 220.

Once operational risk engine 230 has calculated risk scores for a certain type of node 212 (e.g., person nodes 310), operational risk engine 230 may then order the calculated operational risk scores in order to rank the risk scores. For example, operational risk engine 230 may order person operational risk scores 234 from highest to lowest in order to assign a ranking to person operational risk scores 234. In the example of FIG. 4, operational risk engine 230 may assign a "high operational risk person" ranking to person node 310A since it has the highest person operational risk score 234 of 810, a "medium operational risk person" ranking to person node 310B since it has the middle person operational risk score 234 of 290, and a "low operational risk person" ranking to person node 310C since it has the lowest person operational risk score 234 of 50.

Person risk engine 240 calculates risk scores of certain nodes 212 using graph data 125 and defined data risk scores 217. Using the example graph data 125 of FIG. 5A, person risk engine 240 calculates person data risk score 246, machine access data risk score 245, permission data risk score 244, user role data risk score 243, permission data risk score 242, and application data risk score 241.

In general, person risk engine 240 may calculate risk scores in a similar manner to how data risk engine 220 calculates data risk scores. In some embodiments, for example, person risk engine 240 may first determine which nodes 212 have defined data risk scores 217. In the example of FIG. 5A, person risk engine 240 may determine that data type nodes 350 have defined data risk scores 217. Person risk engine 240 may then propagate defined data risk scores 217 out from data type nodes 350 according to edges 215. For example, the risk score of data type node 350D (e.g., defined data risk score 217D of 20) may be propagated according to edge 215 to machine access node 370 in order to calculate machine access data risk score 245. Person risk engine 240 may calculate the risk score of each node 212 using any appropriate method. For example, person risk engine 240 may add all risk scores together that are propagated to each node 212 as described above in reference to data risk engine 220.

Data security engine 250 receives risk scores from data risk engine 220, operational risk engine 230, and person risk engine 240 and then sends an alert 252 and/or performs a security action 257 based on the received risk scores. In some embodiments, data security engine 250 analyzes the received risk scores and determines if any are greater than or equal to a threshold value. If so, data security engine 250 may send an alert 250 to an appropriate user 105. In some embodiments, alert 252 may include an indication of which entity within graph data 125 exceeded the threshold risk value. For example, if the person data risk score 225A of person node 310A exceeded the threshold risk value, alert 252 may include the name of the person associated with person node 310A. In some embodiments, alert 252 may include a graphic that depicts graph data 125 as illustrated in FIGS. 3-5.

In some embodiments, data security engine 250 may perform or otherwise initiate action 257 based on received risk scores from data risk engine 220, operational risk engine 230, and person risk engine 240. For example, if received server data risk score 221A for server node 360A is greater than or equal to a threshold value, data security engine 250 may attempt to move data from a server associated with server node 360A to another server that has a lower server data risk score 221. Examples of other actions 257 may include installing security software on one or more computing systems, moving one or more computing systems to a different network 115, configuring one or more computing systems for redundancy, and configuring a firewall. In some embodiments, actions 257 are performed automatically by data security engine 250 without any intervention by, for example, a user 105. As a result, data and operational risks are automatically addressed by data security and risk ranking tool 130.

FIG. 5B illustrates another example embodiment of graph data 125. The graph data 125 in FIG. 5B is similar to the graph data 125 in FIG. 5B, except with a few additions. In FIG. 5B, graph data 125 additionally includes job function nodes 390 (e.g., 390A and 390B). Job function nodes 390 may indicate a particular function performed by an employee within an organization (e.g., trader, secretary, customer service representative, etc.). Each job function node 390 may have an associated reputational risk 247 and/or an equity risk 248. Each reputational risk 247 may indicate how much risk the particular job function is to an organization's reputation. For example, a job function that has no interaction with social media or customers may have a lower reputational risk 247 than a job function that has constant contact with social media or customers. Each equity risk 247 may indicate how much financial risk the particular job function is to an organization. For example, a job function that deals with money (e.g., a trader) may have a higher equity risk 248 than a job function that has no interaction with money. Data security and risk ranking tool 130 may utilize the methods and processes described herein to calculate person data risk score 225, person operational risk score 234, a person reputational risk score 251, and a person equity risk score 249 for particular person nodes 310.

FIG. 6 is a flowchart illustrating a method 600 for ranking data security and risk using system 100 of FIG. 1. In certain embodiments, data security and risk ranking tool 130 performs method 600. By performing method 600, data security and risk ranking tool 130 identifies entities such as employees or servers that have unacceptable data or operational risks. Additionally, data security and risk ranking tool 130 may automatically perform a security action to reduce data or operational risk.

Method 600 may begin in step 610 where graph data is accessed. In some embodiments, the graph data of step 610 is graph data 125 described above. In some embodiments, the graph data is accessed via a network such as network 115. In other embodiments, the graph data is stored locally on the same device that performs method 600.

In step 620, a plurality of defined data risk scores are determined from the graph data of step 610. In some embodiments, the defined data risk scores are defined data risk scores 217 described above.

In step 630, a plurality of calculated data risk scores are calculated using the plurality of defined data risk scores of step 620 and a plurality of nodes and edges from the graph data of step 610. In some embodiments, each calculated data risk score indicates an amount of data risk for a respective one of the nodes. In some embodiments, the calculated data risk scores are one or more of server data risk score 221, application data risk score 222, permission data risk score 223, user role data risk score 224, and person data risk score 225.

In step 640, a plurality of defined operational risk scores are determined from the graph data of step 610. In some embodiments, the defined operational risk scores are defined operational risk scores 218 described above.

In step 650, a plurality of calculated operational risk scores are calculated using the plurality of defined operational risk scores of step 640 and a plurality of nodes and edges from the graph data of step 610. In some embodiments, each calculated operational risk score indicates an amount of operational risk for a respective one of the nodes. In some embodiments, the calculated operational risk scores are one or more of server operational risk score 231, permission operational risk score 232, user role operational risk score 233, and person operational risk score 234.

At step 660, method 600 determines whether any of the calculated data or operational risk scores of step 630 and 650 equal or exceed a predefined score. If so, method 600 proceeds to step 670. Otherwise, method 600 may end.

At step 670, method 600 sends an alert that indicates which calculated risk score exceeds the predefined score. In some embodiments, the alert of this step is alert 252.

At step 680, method 600 initiates a security action related to the calculated risk score that exceeds the predefined score. In some embodiments, the security action of this step is action 257. After step 680, method 600 may end.

Modifications, additions, or omissions may be made to method 600 depicted in FIG. 6. Method 600 may include more, fewer, or other steps. For example, steps may be performed in parallel or in any suitable order. While discussed as data security and risk ranking tool 130 performing the steps of method 600, any suitable component of system 100, such as device(s) 110 for example, may perform one or more steps of method 600.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A risk ranking tool, comprising:
one or more memory devices; and
a processor communicatively coupled to the one or more memory devices, the processor operable to:
access graph data from a graph database;
determine a plurality of defined data risk scores from the graph data;
calculate, using the plurality of defined data risk scores and a plurality of nodes and edges from the graph data, a plurality of calculated data risk scores that each indicate an amount of risk to data associated with a respective one of the nodes;
determine an order for the plurality of calculated data risk scores;
assign a risk level to the plurality of calculated data risk scores according to the determined order;
determine a plurality of defined operational risk scores from the graph data;
calculate, using the plurality of defined operational risk scores and the plurality of nodes and edges from the graph data, a plurality of calculated operational risk scores that each indicate an amount of risk to an operation of a business associated with a respective one of the nodes;
access the calculated data risk scores and the operational risk scores; and
determine whether any of the calculated data risk scores or operational risk scores equal or exceed a predefined score, and in response:
send an alert that indicates which calculated risk score exceeds the predefined score; and
initiate a security action related to the calculated risk score that exceeds the predefined score.

2. The risk ranking tool of claim 1, wherein the security action comprises one or more of:
moving one or more computing systems to a different network;
installing security software on one or more computing systems;
moving data from one computing system to another computing system to reduce a particular data risk score;
configuring one or more computing systems for redundancy; and
configuring a firewall.

3. The risk ranking tool of claim 1, wherein the plurality of calculated data risk scores comprises:
a plurality of server data risk scores;
a plurality of application data risk scores;
a plurality of permission data risk scores;
a plurality of user role data risk scores; and
a plurality of person data risk scores.

4. The risk ranking tool of claim 1, wherein the plurality of calculated operational risk scores comprises:
a plurality of server operational risk scores;
a plurality of permission operational risk scores;
a plurality of user role operational risk scores; and
a plurality of person operational risk scores.

5. The risk ranking tool of claim 1, wherein the plurality of nodes comprises:
a plurality of server nodes;
a plurality of application nodes;
a plurality of permission nodes;
a plurality of user role nodes;
a plurality of person nodes; and
a plurality of data type nodes.

6. The risk ranking tool of claim 1, wherein calculating the plurality of calculated data risk scores comprises:
determining nodes that have defined data risk scores; and
propagating the defined data risk scores from their respective nodes to each node that is directly or indirectly connected to the nodes that have defined data risk scores;
wherein all defined data risk scores that are propagated to each particular node are added together to determine the calculated data risk score for that particular node.

7. The risk ranking tool of claim 1, wherein calculating the plurality of calculated operational risk scores comprises:
determining nodes that have defined operational risk scores; and
propagating the defined operational risk scores from their respective nodes to each node that is directly or indirectly connected to the nodes that have defined operational risk scores;
wherein all defined operational risk scores that are propagated to each particular node are added together to determine the calculated operational risk score for that particular node.

8. A method comprising:
accessing graph data from a graph database;
determining a plurality of defined data risk scores from the graph data;
calculating, using the plurality of defined data risk scores and a plurality of nodes and edges from the graph data, a plurality of calculated data risk scores that each indicate an amount of risk to data associated with a respective one of the nodes;
determining an order for the plurality of calculated data risk scores;

assigning a risk level to the plurality of calculated data risk scores according to the determined order;

determining a plurality of defined operational risk scores from the graph data;

calculating, using the plurality of defined operational risk scores and the plurality of nodes and edges from the graph data, a plurality of calculated operational risk scores that each indicate an amount of risk to an operation of a business associated with a respective one of the nodes;

accessing the calculated data risk scores and the operational risk scores;

determining whether any of the calculated data or operational risk scores equal or exceed a predefined score, and in response:

sending an alert that indicates which calculated risk score exceeds the predefined score; and initiating a security action related to the calculated risk score that exceeds the predefined score.

9. The method of claim 8, wherein the security action comprises one or more of:

moving one or more computing systems to a different network;

installing security software on one or more computing systems;

moving data from one computing system to another computing system to reduce a particular data risk score;

configuring one or more computing systems for redundancy; and configuring a firewall.

10. The method of claim 8, wherein the plurality of calculated data risk scores comprises:

a plurality of server data risk scores;

a plurality of application data risk scores;

a plurality of permission data risk scores;

a plurality of user role data risk scores; and a plurality of person data risk scores.

11. The method of claim 8, wherein the plurality of calculated operational risk scores comprises:

a plurality of server operational risk scores;

a plurality of permission operational risk scores;

a plurality of user role operational risk scores; and a plurality of person operational risk scores.

12. The method of claim 8, wherein the plurality of nodes comprises:

a plurality of server nodes;

a plurality of application nodes;

a plurality of permission nodes;

a plurality of user role nodes;

a plurality of person nodes; and a plurality of data type nodes.

13. The method of claim 8, wherein calculating the plurality of calculated data risk scores comprises:

determining nodes that have defined data risk scores; and propagating the defined data risk scores from their respective nodes to each node that is directly or indirectly connected to the nodes that have defined data risk scores;

wherein all defined data risk scores that are propagated to each particular node are added together to determine the calculated data risk score for that particular node.

14. The method of claim 8, wherein calculating the plurality of calculated operational risk scores comprises:

determining nodes that have defined operational risk scores; and propagating the defined operational risk scores from their respective nodes to each node that is directly or indirectly connected to the nodes that have defined operational risk scores;

wherein all defined operational risk scores that are propagated to each particular node are added together to determine the calculated operational risk score for that particular node.

15. One or more computer-readable non-transitory storage media embodying software that is operable when executed to:

access graph data from a graph database;

determine a plurality of defined data risk scores from the graph data;

calculate, using the plurality of defined data risk scores and a plurality of nodes and edges from the graph data, a plurality of calculated data risk scores that each indicate an amount of risk to data associated with a respective one of the nodes;

determine an order for the plurality of calculated data risk scores;

assign a risk level to the plurality of calculated data risk scores according to the determined order;

determine a plurality of defined operational risk scores from the graph data;

calculate, using the plurality of defined operational risk scores and the plurality of nodes and edges from the graph data, a plurality of calculated operational risk scores that each indicate an amount of risk to an operation of a business associated with a respective one of the nodes;

access the calculated data risk scores and the operational risk scores;

determine whether any of the calculated data or operational risk scores equal or exceed a predefined score, and in response:

send an alert that indicates which calculated risk score exceeds the predefined score; and initiate a security action related to the calculated risk score that exceeds the predefined score.

16. The media of claim 15, wherein the security action comprises one or more of:

moving one or more computing systems to a different network;

installing security software on one or more computing systems;

moving data from one computing system to another computing system to reduce a particular data risk score;

configuring one or more computing systems for redundancy; and configuring a firewall.

17. The media of claim 15, wherein the plurality of calculated data risk scores comprises:

a plurality of server data risk scores;

a plurality of application data risk scores;

a plurality of permission data risk scores;

a plurality of user role data risk scores; and a plurality of person data risk scores.

18. The media of claim 15, wherein the plurality of calculated operational risk scores comprises:

a plurality of server operational risk scores;

a plurality of permission operational risk scores;

a plurality of user role operational risk scores; and a plurality of person operational risk scores.

19. The media of claim 15, wherein the plurality of nodes comprises:

a plurality of server nodes;

a plurality of application nodes;
a plurality of permission nodes;
a plurality of user role nodes;
a plurality of person nodes; and
a plurality of data type nodes.

20. The media of claim 15, wherein:
calculating the plurality of calculated data risk scores comprises:
  determining nodes that have defined data risk scores; and
  propagating the defined data risk scores from their respective nodes to each node that is directly or indirectly connected to the nodes that have defined data risk scores;
calculating the plurality of calculated operational risk scores comprises:
  determining nodes that have defined operational risk scores; and
  propagating the defined operational risk scores from their respective nodes to each node that is directly or indirectly connected to the nodes that have defined operational risk scores; and
all defined data risk scores that are propagated to each particular node are added together to determine the calculated data risk score for that particular node.

* * * * *